(12) United States Patent
Feuer et al.

(10) Patent No.: US 8,019,222 B2
(45) Date of Patent: Sep. 13, 2011

(54) DIGITAL ENCODING OF LABELS FOR OPTICAL PACKET NETWORKS

(75) Inventors: Mark David Feuer, Colts Neck, NJ (US); Vinay Anant Vaishampayan, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 61 days.

(21) Appl. No.: 12/371,679

(22) Filed: Feb. 16, 2009

(65) Prior Publication Data

US 2009/0169210 A1    Jul. 2, 2009

Related U.S. Application Data

(63) Continuation of application No. 11/283,978, filed on Nov. 21, 2005, now Pat. No. 7,512,342.

(51) Int. Cl.
*H04J 14/00* (2006.01)
*H04B 10/04* (2006.01)

(52) U.S. Cl. .............................. 398/78; 398/77; 398/185

(58) Field of Classification Search .................... 398/77, 398/78, 185

See application file for complete search history.

(56) References Cited

U.S. PATENT DOCUMENTS

| 4,573,155 | A | 2/1986 | Currie et al. |
| 5,146,359 | A | 9/1992 | Okoshi et al. |
| 6,025,944 | A * | 2/2000 | Mendez et al. ................. 398/78 |
| 6,088,144 | A | 7/2000 | Doerr |
| 7,085,969 | B2 * | 8/2006 | Zheng et al. .................. 714/701 |
| 7,177,544 | B1 | 2/2007 | Wada et al. |
| 2002/0027686 | A1 | 3/2002 | Wada et al. |
| 2003/0206557 | A1 * | 11/2003 | Chen et al. .................... 370/474 |
| 2004/0131046 | A1 | 7/2004 | Kim et al. |

OTHER PUBLICATIONS

M. D. Feuer and V. A. Vaishampayan, "In-band management channel for lightpaths in photonic networks," in ECOC 2004, Sep. 6-8, 2004, Paper Tu3.6.3.*
Mark D. Feuer et al., "In-Band Management Channel for Lightpaths in Photonic Networks", from Proceedings of ECOC2004 (Stockholm 2004) paper Tu3.6.3 (corrected version); two pages.

* cited by examiner

*Primary Examiner* — Nathan Curs

(57) ABSTRACT

Methods and apparatuses are provided for transmitting labels in an optical packet network. Groups of K payload bits are encoded into blocks of N bits by using a code in which each of the groups of K payload bits is represented by a corresponding one of at least two distinct codewords of differing weights to form coded payload packet data, where K and N are integers and K<N. Composite packet data is produced by choosing among the at least two distinct codewords according to a value of chip data based, at least partly, on label data. An optical signal for transmission via the optical network is produced by applying the composite packet data to an optical transmitter.

18 Claims, 3 Drawing Sheets

DIGITAL ENCODING OF LABELS FOR OPTICAL PACKET NETWORKS

PRIORITY

This application is a continuation of U.S. patent application Ser. No. 11/283,978, filed Nov. 21, 2005, the contents of which is incorporated herein by reference in its entirety.

BACKGROUND OF THE INVENTION

1. Field of the Invention

The present invention relates generally to optical networking, and more particularly, to a method and apparatus for embedding label information within individual optical packets in a manner enabling the label information to be read by a low-bandwidth, low-cost receiver.

2. Introduction

Packet networks transport data from a source location to a destination location by organizing the data into self-contained units called packets. Each packet carries its routing information as it passes through a series of routing nodes on its way to the destination location. Each routing node reads the routing information associated with the packet and uses that information to decide the correct path to use to forward the packet. In traditional IP (Internet Protocol) networks, the routing information is made up of individual addresses of source and destination nodes. In more advanced MPLS (Multiprotocol Label Switching) networks, packets are assigned additional labels that group them according to their intermediate or final destinations. This label assignment promotes efficient scaling and quality-of-service assignment in the MPLS networks. In both IP and MPLS networks with optical transport between routing nodes, all packets are converted from optical to electrical form as they enter the routing node and then converted back to optical form as they leave the routing node. Minimization of such Optical-Electronic-Optical (OEO) conversions is a central principle of cost reduction in advanced optical networks. Removing OEO conversions and electronic switching also helps with scaling the routers to massive capacity, since these electronic functions contribute to the buildup of cost, failure rate, and power dissipation in the router nodes.

As a result, Optical Label Switching (OLS) networks are under intensive study as a means of combining the flexibility and statistical multiplexing of electronic IP packet networks with the cost-effectiveness and massive scalability of optical data transport. OLS networks include an optical label (OL) with each packet of payload data, and the OL is read at each routing node to determine the proper switch settings for packet forwarding. OLs may be in-band, sent as headers occupying the first bytes of every packet, but that approach requires expensive photoreceivers capable of operating at full data rate. Thus, OLs are usually sent in a separate out-of-band channel.

The value of OLS networks is greatly enhanced when they can carry multiple optical packets simultaneously. Such a capability can be implemented through the use of wavelength division multiplexing (WDM), in which each packet is assigned to a specific wavelength of light. Using WDM, multiple simultaneous packets are combined at the source with an arrangement of optical wavelength filters called a wavelength multiplexer (MUX), and re-separated before detection at the destination with a reciprocal arrangement of optical filters called a wavelength demultiplexer (DMUX). WDM presents OLS networks with an additional challenge of reading multiple OLs that are simultaneously present at any given point in the network. For in-band labels, the straightforward solution is to follow a DMUX with a parallel array of label receivers, but this becomes expensive as the wavelength count becomes large. Alternatively, one might place a tunable wavelength selection filter before a shared label receiver, but this would reduce packet throughput and demand extremely complex network synchronization.

Various of out-of-band OL technologies have been proposed for WDM OLS networks. Some use dedicated label wavelengths for each packet wavelength, reducing spectral efficiency of the networks. Others rely on orthogonal modulation formats, such as optical phase shift keying (PSK) for labels in combination with amplitude shift keying (ASK) for payloads. Although this approach can reduce the number of full-rate OEO conversions and enable optical label switching, it often has flaws such as complex modulation formats, crosstalk caused by optical impairments, or high cost.

Thus, there is a need for a practical method of encoding optical labels carrying routing information in optical packet networks.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for transmitting labels in an optical packet network is provided. Groups of K payload bits are encoded into blocks of N bits by using a code in which each of the groups of K payload bits is represented by a corresponding one of at least two distinct codewords of differing weights to form coded payload packet data, where K and N are integers and K<N. Composite packet data is produced by choosing among the at least two distinct codewords according to a value of chip data based, at least partly, on label data. An optical signal for transmission via the optical network is produced by applying the composite packet data to an optical transmitter.

In a second aspect of the invention, a method for reading received label data in an optical packet network is provided. A composite optical signal is detected with a photodiode having a maximum frequency of operation that is less than one-half of a rate of received payload packet data. Label data included in the composite optical signal detected by the photodiode is recovered. The detected composite signal is formed by encoding groups of K payload bits into blocks of N bits by using a code in which each of the groups of K payload bits is represented by a corresponding one of at least two distinct codewords of differing weights to form coded payload packet data, where K and N are integers and K<N. Composite packet data is produced by choosing among the at least two distinct codewords according to a value of chip data based, at least partly, on the label data. The composite optical signal is produced for transmission via the optical packet network by applying the composite packet data to an optical transmitter.

In a third aspect of the invention, an apparatus for encoding packets for transmission via an optical packet network is provided. The apparatus includes an encoder and an optical transmitter. The encoder is configured to produce blocks of N bits of coded payload data from groups of K bits of raw payload data by (1) using a code in which each of the groups of K bits of raw payload data is represented by a corresponding one of at least two distinct codewords of differing weights to form coded payload packet data, where K and N are integers and K<N and (2) choosing among the at least two distinct codewords according to a value of chip data based, at least partly, on label data, to produce composite packet data The optical transmitter is configured to produce a composite optical signal from the composite packet data for transmission via the optical packet network.

In a fourth aspect of the invention, an apparatus for decoding optical packets received via an optical packet network is provided. The apparatus includes a photodiode and sampling circuitry. The photodiode is arranged to detect a composite optical signal and has a maximum frequency of operation that is less than one-half of a rate of received payload packet data. The sampling circuitry is configured to be clocked at a multiple or a submultiple of a rate of the chip data and to produce sampled data based on the detected composite optical signal. The sampled data is based, at least partly, on label data. The detected composite signal is formed by encoding groups of K payload bits encoded into blocks of N bits by using a code in which each of the groups of K payload bits is represented by a corresponding one of at least two distinct codewords of differing weights to form coded payload packet data, where K and N are integers and K<N, choosing among the at least two distinct codewords according to a value of chip data based, at least partly, on the label data, to produce composite packet data, and applying the composite packet data to an optical transmitter to produce the composite optical signal for transmission via the optical packet network.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

INTRODUCTION

Optical labels can also be useful in circuit-switched networks, especially those capable of dynamically re-routing signals on a wavelength-by-wavelength basis. U.S. patent application Ser. No. 11/101,778, filed on Apr. 8, 2005 and hereby incorporated by reference herein in its entirety, introduces a new digital encoding process optimized for path tracing in circuit-switched optical networks with minimal OEO conversion. Using complementary constant weight codes, this encoding process may embed an auxiliary channel with management information into high-speed payload data in such a way that the management information can be extracted by low cost photoreceivers without a need to process, or even detect, the high-speed payload data. For WDM networks, a layer of Code Division Multiple Access (CDMA) coding may be added to enable a single auxiliary receiver to capture and decode individual label data from multiple wavelengths simultaneously. For more advanced reconfigurable networks, it may be desirable to rewrite optical labels without OEO conversion at network elements such as wavelength converters or all-optical regenerators.

Exemplary Optical Packet Network

Figure 1:
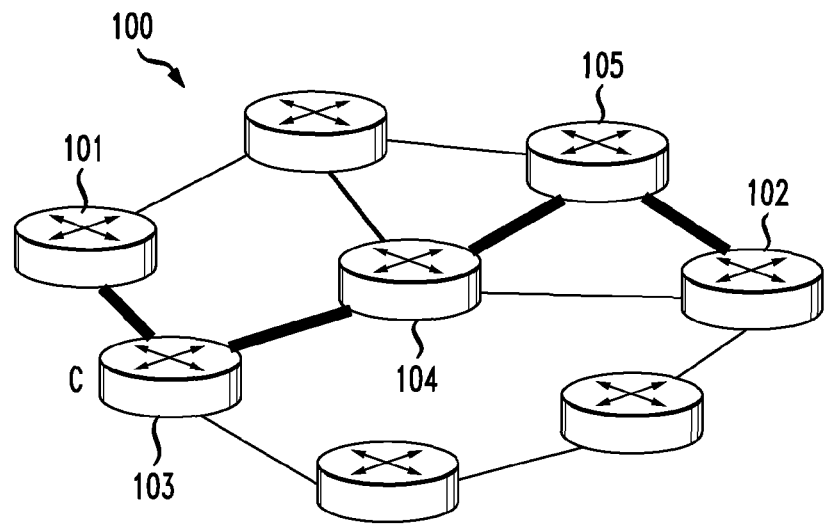
FIG. 1 illustrates an exemplary optical network in which embodiments consistent with principles of the invention may be implemented.

FIG. 1 illustrates an exemplary optical packet network 100 which may include implementations consistent with the principles of the invention. Optical packet network 100 may include a number of nodes. For each packet, one node may be designated as a source node 101, one or more nodes may be designated as intermediate nodes, 103, 104 and 105, and one or more nodes may be designated as destination nodes 102. Each node should have a connection to at least one other node and there should be a path or route between any source node 101 and destination node 102.

Exemplary Encoding Implementations

Figure 2A:
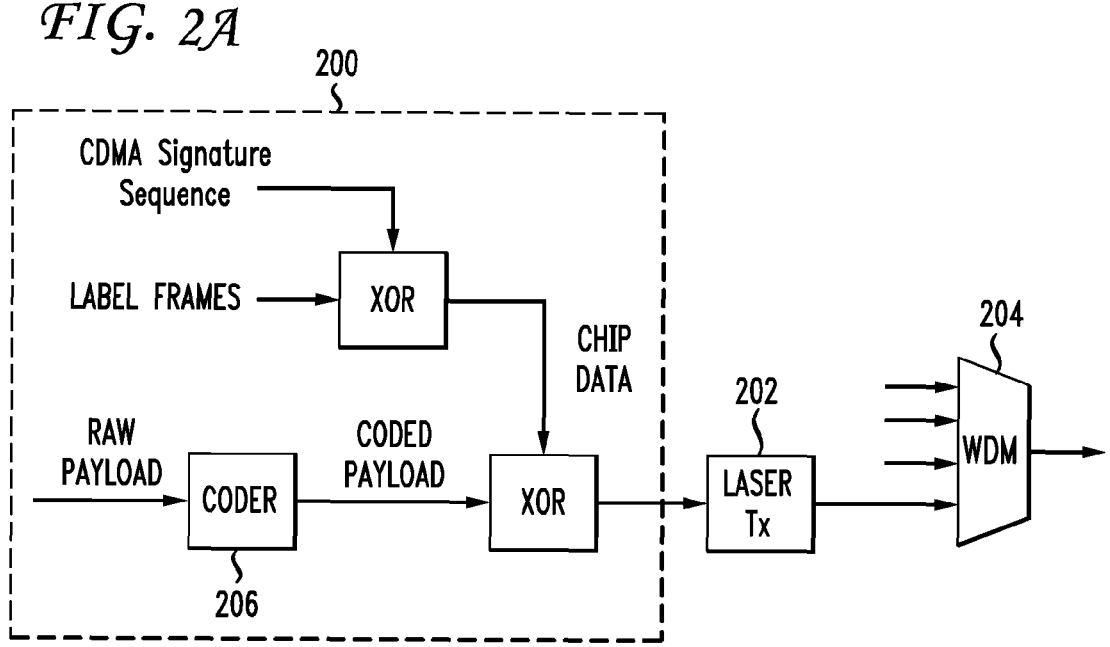
FIG. 2A illustrates an exemplary apparatus for encoding and transmitting optical packets consistent with principles of the invention.

FIG. 2A illustrates an exemplary apparatus that may be included in source nodes 101 of optical network 100. The apparatus may include a digital encoder 200 and a laser transmitter 202. In some implementations consistent with the principles of the invention, the apparatus may include a wave division multiplexer (WDM) 204.

Digital encoder 200 may include coder 206, which may encode each group of K bits of raw payload data into a block of N bits of coded payload data, where K<N. Digital encoder 200 may employ a complementary constant-weight code (CCWC) with $2^{K+1}$ codewords. Half of the codewords may have a constant weight of W, where W<N/2, and a second half of the codewords may have a constant weight of N-W, obtained by inverting or complementing each codeword having a constant weight of W. Each group of K bits of the raw payload data may always be encoded by coder 206 into a block of N bits of coded payload data by using a codeword of constant weight W. Thus, the weight of the blocks of coded payload data may be uniform, and the average power may be constant.

A label message or frame may include routing information for an optical packet In some implementations consistent with the principles of the invention, each label frame may be spread by a signature sequence such as, for example, a CDMA signature sequence to produce binary chip data. In exemplary encoder 200, each bit of a label frame is XOR'ed with a bit of the signature sequence.

Next, the coded payload data may be XOR'ed with the chip data to produce composite packet data. The composite packet data for a single frame of label data may comprise C chips, each having a length of B data blocks of N bits. This XOR process may replace some of the blocks with their complements, producing a data pattern whose average power shows a binary modulation according to the chip data, with effective modulation index $(1-2W/N)$. Thus, each 1 or 0 chip of the chip data may be encoded in B blocks or N×B bits of the final coded composite packet data, and each frame of the label data may be encoded in B×C blocks or N×B×C bits of the final coded composite packet data.

The CDMA layer may provide a mechanism for many packets on different wavelengths in a WDM network to share a single all-wavelength label receiver. The CDMA-based spectrum spreading may also contribute to a longer averaging interval that enhances immunity to optical amplifier noise. The fully-coded composite packet data, combining both payload data and label data in a single binary pattern, may be fed to a standard optical transmitter such as, for example, laser transmitter 202, to produce an on-off-keyed (OOK) optical signal that can be combined with similarly coded optical signals at other wavelengths by a wave division multiplexer (WDM) 204 for transmission through the optical packet network.

Although the above-described implementation may use constant-weight codes, in other implementations other types of complementary or non-complementary codes may be used. In alternative implementations consistent with the principles of the invention, two different code blocks may represent each pattern of payload bits, and the label frame may be encoded into the weight of these two alternative code blocks. In one alternative implementation, one alternative code block may have a lower weight that is less than a first threshold and a second alternative code block may have a higher weight that is higher than a second threshold, which may be higher than the first threshold. In some implementations, the first and second thresholds may be equal.

Further, the CDMA layer may be replaced by a different multiple-access technique or, optionally, may be omitted entirely if the photodiode(s) of the optical receiver(s) are not shared among multiple wavelengths. In an implementation using single-wavelength receivers, the coded payload data may be XOR'd directly with the frame bits of the label data instead of with the chip data.

Figure 2B:
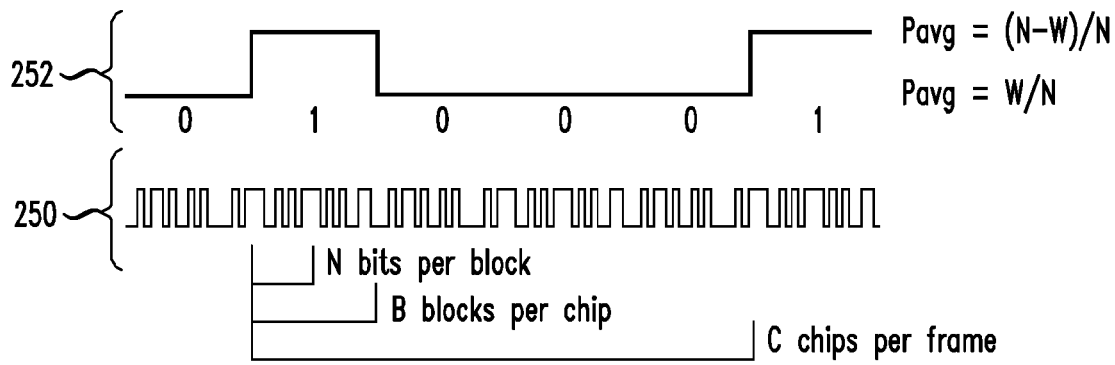
FIG. 2B shows aspects of exemplary encoding of coded payload data with chip data.

FIG. 2B illustrates encoding of a portion of chip data onto a portion of coded payload data to produce a coded composite packet data 250 in one implementation consistent with the principles of the invention. Coded composite packet data 250 is shown as having N bits per block, B blocks per chip, and C chips per frame. Chip data portion 252 is shown as chips 010001, which are to be encoded onto the portion of the coded payload data to produce the coded composite packet data 250. In the example of FIG. 2B, each chip of chip data 252 may be encoded into N*B bits of coded composite packet data 250. In one implementation, each 0 chip of chip data 252 is encoded over B blocks of N bits of coded payload data producing N*B bits of coded composite packet data 250 in which each block of N bits has an average power of W/N; and each 1 chip of chip data 252 is encoded over B blocks of N bits of coded payload data producing N*B bits of coded composite packet data 250 in which each block of N bits has an average power of $(N-W)/N$. Thus, chip data 252 may be recovered from coded composite packet data 250 based on the average power of B blocks of N bits each.

Although the above example describes each 0 chip of chip data 252 being encoded into coded composite packet data 250 as a group of blocks having an average power of W/N, and describes each 1 chip of chip data 252 being encoded into coded composite packet data 250 as a group of blocks having an average power of $(N-W)/N$, each 0 chip of chip data 252 may be encoded into a group of blocks having an average power of $(N-W)/N$, and each 1 chip of chip data 252 may be encoded into a group of blocks having an average power of W/N.

Figure 3:
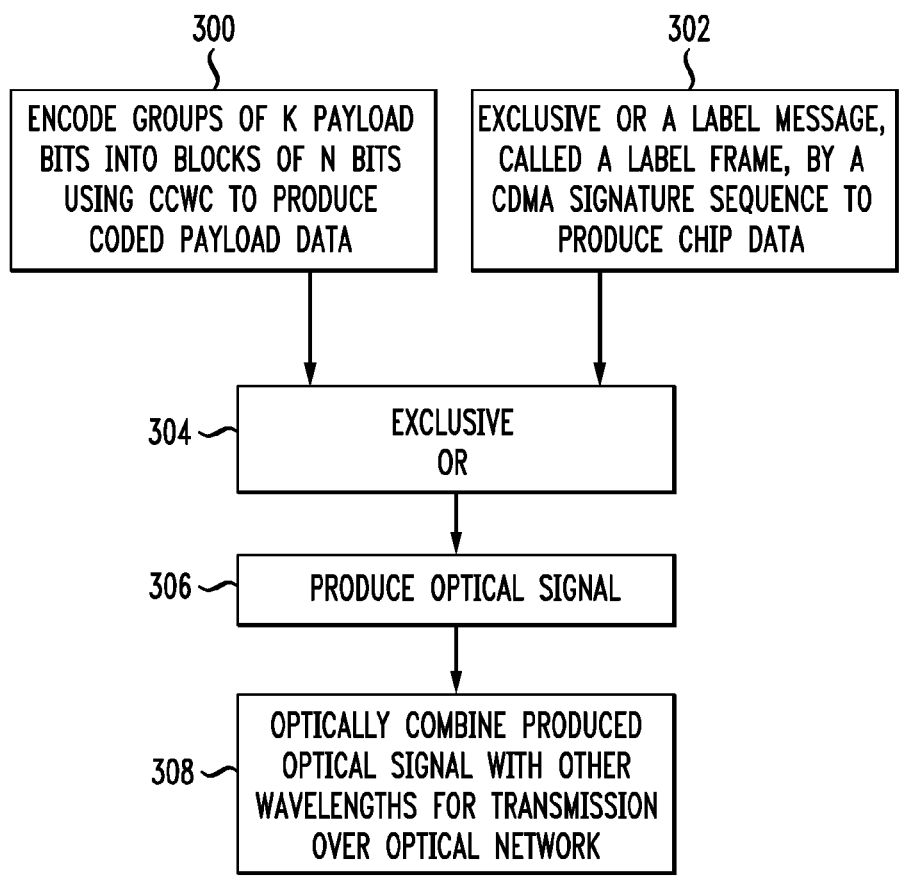
FIG. 3 is a flowchart that describes an exemplary encoding process consistent with the principles of the invention.

FIG. 3 is a flowchart that helps to illustrate an exemplary process that may be used to encode label data into optical packets in an implementation consistent with the principles of the invention. Groups of K payload bits may be encoded, via coder 206, into N bit blocks of coded payload data using codewords of a CCWC code having a constant weight of W (act 300). In parallel, information from a label message may be XOR'ed with a signature sequence such as, for example, a CDMA signature sequence, to produce chip data having a rate that may be an integer multiple of the label rate (act 302). Next, each group of B blocks of N bits of the coded payload data may be XOR'ed with one chip of the chip data to produce a portion of coded composite packet data (act 304). Thus, a 1 bit of the chip data may invert N*B bits of coded payload data, having a constant weight of W*B, to produce N*B bits of the coded composite packet data having a constant weight of $(N-W)*B$. An optical transmitter, such as laser transmitter 202, may produce an optical signal of a particular wavelength, corresponding to the coded composite packet data (act 306). One or more produced optical signals of other wavelengths may be optically combined with the coded composite packet data via WDM 204 to be transmitted as optical packets via an optical packet network (act 308).

Exemplary Decoding Implementations

Figure 4:
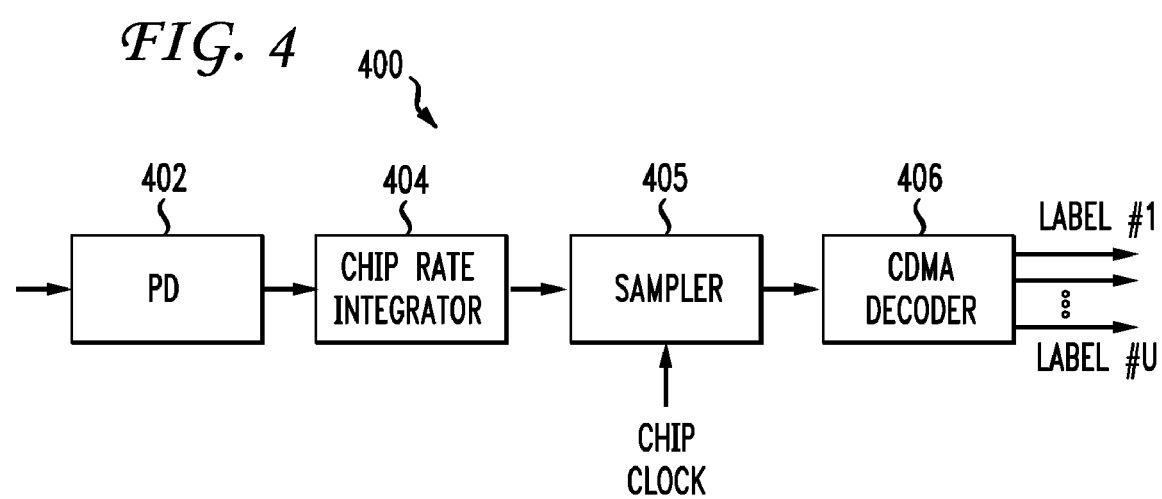
FIG. 4 illustrates an exemplary apparatus, consistent with the principles of the invention, for detecting a composite optical signal and recovering label data from the composite optical signal.

FIG. 4 illustrates an exemplary apparatus 400 for detecting and decoding label frames encoded onto optical packets in an optical packet network by an apparatus such as, for example, the exemplary apparatus of FIG. 2A. Apparatus 400 may be included in intermediate nodes such as, for example, routing nodes of an optical network. Apparatus 400 may include a photodiode (PD) 402 such as, for example, a slow PD, a chip rate integrator 404, a sampler 405 and a decoder 406 such as, for example, a CDMA decoder.

Multiple wavelengths may impinge on PD 402, which is capable of responding at the chip rate. That is, PD 402 may have a maximum frequency of operation that is less than one-half of the rate of received composite packet data. The resulting electrical signal is made up of a superposition of chip data from the various wavelengths. Chip rate integrator 404 and sampler 405 may perform sampling such as, for example, integrate-and-dump sampling, clocked to the (synchronous) chip data to assure complete rejection of the payload data. Decoder 406 may operate on analog chip samples from sampler 405 to recover individual optical labels.

Due to simplicity of the label receiver design, the digital label encoding method can achieve significant cost benefits over a system in which in-band labels are incorporated into conventional packet headers. A conventional packet scheme requires multiple 10 Gb/s receivers, one for each wavelength. In contrast, the new label encoding method may use a single photodiode and accompanying circuitry that is significantly less expensive, operating at ~10 Mb/s. Also, the low-speed chip data can be received at a lower optical power, allowing operation from a low-loss optical tap and eliminating a need for additional optical amplifiers. Finally, a CDMA layer may allow simultaneous reception of labels attached to multiple wavelengths. Digital label encoding also offers an enhanced degree of data privacy. Depending on the throughput demanded for label data, it is possible to operate the apparatus 400 at a power level so low that photon shot noise would obscure the payload information.

CONCLUSION

Although the above description may contain specific details, they should not be construed as limiting the claims in any way. Other configurations of the described embodiments of the invention are part of the scope of this invention. For example, although the above embodiments are described as producing an OOK optical signal, other keying methods may be used such as, for example, amplitude shift keying (ASK) or other methods. Further, implementations consistent with the principles of the invention may have more or fewer acts than as described, or may implement acts in a different order than as shown. Accordingly, the appended claims and their legal equivalents should only define the invention, rather than any specific examples given.

We claim as our invention:

1. A method of transmitting data in an optical packet network, the method comprising:
   encoding via a node in the optical packet network groups of K payload bits into N bit blocks of coded payload data using complimentary constant-weight code (CCWC), wherein the CCWC has $2^{k+1}$ codewords, and wherein a first half of the codewords has a constant weight of W, where W<N/2, and a second half of the codewords has a constant weight of N−W, obtained by inverting each codeword having a constant weight of W;
   in parallel with the encoding step, exclusively OR'ing information from a label message with a signature sequence to produce chip data;
   exclusively OR'ing each group of B blocks of N bits of the coded payload data with one chip of the chip data to produce a portion of coded composite packet data in which each B block in the group of B blocks of N bits has an average power equal to W/N when the one chip is a first chip type and (N−W)/N when the one chip is a second chip type; and
   generating an optical signal of a particular wavelength that corresponds to the coded composite packet data.

2. The method of claim 1, further comprising:
   combining the optical signal with other optical signals of other wavelengths; and
   transmitting the combination of optical signals as optical packets in an optical packet network.

3. The method of claim 1, wherein the signature sequence is a CDMA signature sequence.

4. The method of claim 1, wherein 1 bit of the chip data inverts N*B bits of coded payload data to yield inverted N*B bits of coded payload data.

5. The method of claim 4, wherein the inverted N*B bits of coded payload data has a constant weight W*B.

6. The method of claim 5, further comprising producing N*B bits of the coded composite packet data that has a constant weight (N−W)*B.

7. A node for transmitting data in an optical packet network, the node comprising:
   an encoder configured to:
      encode groups of K payload bits into N bit blocks of coded payload data using complimentary constant-weight code (CCWC), wherein the CCWC has $2^{k+1}$ codewords, and wherein a first half of the codewords has a constant weight of W, where W<N/2, and a second half of the codewords has a constant weight of N−W, obtained by inverting each codeword having a constant weight of W;
      in parallel with the encoding step, exclusively OR information from a label message with a signature sequence to produce chip data; and
      exclusively OR each group of B blocks of N bits of the coded payload data with one chip of the chip data to produce a portion of coded composite packet data in which each B block in the group of B blocks of N bits has an average power equal to W/N when the one chip is a first chip type and (N−W)/N when the one chip is a second chip type; and
   an optical transmitter configured to control the node to generate an optical signal of a particular wavelength that corresponds to the coded composite packet data.

8. The device of claim 7, further comprising:
   a multiplexer configured to combine the optical signal with other optical signals of other wavelengths and transmit the combination of optical signals as optical packets in an optical packet network.

9. The device of claim 7, wherein the signature sequence is a CDMA signature sequence.

10. The device of claim 7, wherein 1 bit of the chip data inverts N*B bits of coded payload data to yield an inverted N*B bits of coded payload data.

11. The device of claim 10, wherein the inverted N*B bits of coded payload data has a constant weight W*B.

12. The device of claim 11, wherein the encoder is further configured to control the node to produce N*B bits of the coded composite packet data that has a constant weight (N−W)*B.

13. An encoder that processes data, the encoder performing steps comprising:
   encoding, via a node in an optical packet network, groups of K payload bits into N bit blocks of coded payload data using complimentary constant-weight code (CCWC), wherein the CCWC has $2^{k+1}$ codewords, and wherein a first half of the codewords has a constant weight of W, where W<N/2, and a second half of the codewords has a constant weight of N−W, obtained by inverting each codeword having a constant weight of W;
   in parallel with the encoding step, exclusively OR'ing information from a label message with a signature sequence to produce chip data;
   exclusively OR'ing each group of B blocks of N bits of the coded payload data with one chip of the chip data to produce a portion of coded composite packet data in which each B block in the group of N bits has an average power equal to W/N when the one chip is a first chip type and (N−W)/N when the one chip is a second chip type; and
   generating an optical signal of a particular wavelength that corresponds to the coded composite packet data.

14. The encoder of claim 13, the steps further comprising:
   combining the optical signal with other optical signals of other wavelengths; and
   transmitting the combination of optical signals as optical packets in an optical packet network.

15. The encoder of claim 13, wherein the signature sequence is a CDMA signature sequence.

16. The encoder of claim 13, wherein 1 bit of the chip data inverts N*B bits of coded payload data.

17. The encoder of claim 16, wherein the inverted N*B bits of coded payload data has a constant weight W*B.

18. The encoder of claim 17, further comprising producing N*B bits of the coded composite packet data that has a constant weight (N−W)*B.

* * * * *